United States Patent [19]
Kim et al.

[11] Patent Number: 5,679,238
[45] Date of Patent: Oct. 21, 1997

[54] METHOD FOR PRODUCING SULFURIC ACID FROM FLUE GAS DESULFURIZATION

[75] Inventors: Bang Mo Kim; Norman Zethward Shilling, both of Schenectady, N.Y.

[73] Assignee: General Electric Company, Schenectady, N.Y.

[21] Appl. No.: 581,869

[22] Filed: Jan. 2, 1996

[51] Int. Cl.$^6$ .................. C25B 1/22; C25B 1/00; B01D 53/02
[52] U.S. Cl. .................. 205/554; 205/510; 95/92; 95/148
[58] Field of Search .................. 95/135, 137, 148, 95/92; 205/554, 495, 496, 510; 96/143

[56] References Cited

U.S. PATENT DOCUMENTS

| | | | |
|---|---|---|---|
| 3,150,923 | 9/1964 | Bienstock et al. | 205/554 |
| 3,523,880 | 8/1970 | Parsi | 205/510 |
| 3,634,028 | 1/1972 | Hohne | 95/135 |
| 3,772,854 | 11/1973 | Tamura et al. | 95/137 |

FOREIGN PATENT DOCUMENTS 50-139072  11/1975  Japan.

OTHER PUBLICATIONS

CAPlus abstract of JP50139072 (Shiraishi et al.) Nov. 6, 1975.

Primary Examiner—Kathryn L. Gorgos
Assistant Examiner—Alexander Noguerola
Attorney, Agent, or Firm—James Magee, Jr.

[57] ABSTRACT

The present invention is directed towards a method that makes sulfuric acid from a dry flue gas desulfurization process which utilizes a low temperature regeneration of the carbon adsorbent in the flue gas process. The sulfuric acid is generated in an electrolytic reactor. This invention is also directed towards a system that regenerates the carbon used in dry flue gas desulfurization at a temperature below 120° C.

3 Claims, 6 Drawing Sheets

METHOD FOR PRODUCING SULFURIC ACID FROM FLUE GAS DESULFURIZATION

This invention is related to copending and commonly assigned U.S. patent applications, LOW-TEMPERATURE METHOD TO REGENERATE CARBON LOADED WITH SULFUR COMPOUNDS, U.S. Ser. No. 08/566,517 (filed Dec. 4, 1995), pending, and RECYCLING OF SODIUM HYDROXIDE AND PRODUCTION OF GYPSUM FROM DRY FLUE GAS DESULFURIZATION, U.S. Ser. No. 08/581,972 (filed Jan. 2, 1996), pending.

FIELD OF THE INVENTION

The invention relates to a system for removal of sulfur dioxide from flue gas using dry carbon adsorbent and producing sulfuric acid. More specifically, the invention relates to a continuous or batch system for removing sulfur dioxide from flue gas, regenerating the carbon adsorbents at low temperature, and producing sulfuric acid from by-products of the low temperature regeneration of the carbon adsorbents used in flue gas desulfurization.

BACKGROUND OF THE INVENTION

Flue gas desulfurization processes, also referred to as FGD, can conveniently be categorized by the manner in which the sulfur compounds removed from the flue gases are eventually produced for disposal. Three main categories exist.

The first category is termed "throwaway process" in which the eventual sulfur product is disposed of as waste. Disposal can include a landfill or pond. The processes in this category involve wet scrubbing of the flue gases for absorption, followed by various methods for neutralizing the acidity, separating the sulfur compounds from the scrubbing liquor, and usually recycling at least part of the scrubbing liquor.

A second category is the gypsum processes, which are designed to produce gypsum of sufficient quality either for use as an alternative to natural gypsum or as a well-defined waste product. As with the throwaway processes, this category involves wet scrubbing for absorption followed by various methods of neutralizing the lime or limestone and recovering the sulfur compound. The sulfur dioxide ($SO_2$) is first absorbed in the solution and then the dissolved sulfur dioxide reacts with lime ($Ca(OH)_2$) or limestone ($CaCO_3$) to produce calcium sulfite ($CaSO_3$). The sulfite species in the slurry are oxidized by oxygen present in the flue gas producing calcium sulfate ($CaSO_4\ 2H_2O$), herein referred to as gypsum. Since gypsum is more desirable than calcium sulfite, additional oxidation is carried out to completely convert calcium sulfite to gypsum, which is an additional oxidation step, also called forced oxidation process.

Regenerative processes, the third category, are designed to specifically regenerate the primary reactants and concentrate the sulfur dioxide ($SO_2$) that has been removed from the flue gases. Further processing can convert the concentrated sulfur dioxide ($SO_2$) into salable by products such as sulfuric acid or elemental sulfur, or physical processing into liquefied sulfur dioxide. Processes in this category contain both wet and dry flue gas desulfurization processes. The major drawbacks of the wet flue gas desulfurization process are scaling and plugging in the absorber; reheating is required for stack gas buoyancy; difficulty is experienced in growing gypsum crystals for efficient solid/liquid separation; and there is minimal removal of nitrogen oxides ($NO_x$). To overcome problems associated with these techniques, the use of activated carbon adsorbents to remove sulfur oxides from flue gases has been used. With oxygen and water in the flue gas, a sulfur loading of the activated carbon ranges between about five and fifteen percent is feasible. However, due to the cost of carbon, the carbon adsorbent needs to be regenerated due to economic considerations.

Generally, regeneration processes for carbon adsorbents occur at elevated temperatures above 120° C., and particularly, above about 400° C. As the temperature increases during the regeneration process, the acid reacts with the carbon and forms carbon dioxide. In addition, the carbon will reduce $SO_3$ to $SO_2$. This reaction produces carbon monoxide and carbon dioxide. These reactions cause carbon loss that consequently affect the process economics and effectiveness of the carbon adsorbent.

There is a need for a system that uses low temperatures to regenerate carbon adsorbents while reducing carbon loss that produces sulfuric acid from the regeneration by-products. There is also a need for a dry low temperature process to regenerate carbon used in flue gas desulfurization that produces a salable by product, sulfuric acid. Also, there is a need for a cost effective system to produce sulfuric acid from a dry low temperature flue gas desulfurization process that produces environmentally safe products and provides easy operation.

SUMMARY OF THE INVENTION

This invention satisfies these needs by providing a system to produce sulfuric acid from dry flue gas desulfurization comprising the steps of: adsorbing sulfur dioxide from a flue gas stream in a dry activated carbon adsorbent; regenerating the carbon adsorbent contaminated with sulfur or sulfur-containing compounds by washing the carbon adsorbent with a sufficient amount of a basic reducing solution consisting essentially of sodium sulfite and water having a pH above 7.0 at a temperature below 120° C. for a sufficient amount of time to reduce $SO_3$ to a $SO_2$ by-product and produce sodium sulfate in the solution; using an electrochemical reactor to convert the sodium sulfate solution to sulfuric acid at an anode and sodium hydroxide at a cathode. A sufficient amount of a basic reducing solution is an amount necessary to reduce $SO_3$ to $SO_2$ in the carbon adsorbent. The sulfuric acid and sodium hydroxide are the by products from the electrochemical dissociation of sodium sulfate.

This invention also encompasses a method of recycling sodium hydroxide from the sodium sulfate solution that is formed from low temperature carbon regeneration from dry flue gas desulfurization in the electrolytic reactor; and reacting the sodium hydroxide solution with a $SO_2$ by-product from regeneration of a carbon adsorbent to produce a sodium sulfite reducing solution.

An advantage of this invention is the use of low temperatures below 120° C. at which the regeneration reactions take place. The low temperature capability provides energy cost savings as well as increased safety precautions by reducing the risk of fire that is posed by high temperature carbon regeneration processes. A further advantage of this invention is that the carbon adsorbent has a longer life due to little or no loss of carbon from the regeneration reactions. The carbon does not enter into the reactions of the sulfur or sulfur-containing species removal from the adsorbent. Still another advantage of this invention is the elimination of the forced oxidation step in the production of sulfuric acid. Yet another advantage is the recycling of sodium hydroxide to form the sodium sulfite reducing solution that is used to regenerate the carbon adsorbent used in dry flue gas desulfurization.

DESCRIPTION OF THE INVENTION

The present invention is directed towards a system that makes sulfuric acid from a dry flue gas desulfurization process which utilizes a low temperature regeneration of the carbon adsorbent in the flue gas process. The sulfuric acid is made in an electrolytic reactor with a cation membrane between the cathode and anode in the electrolytical cell. This invention is also directed towards a system that regenerates the carbon used in dry flue gas desulfurization at a temperature below 120° C. Temperatures below 120° C. are herein referred to as low-temperature methods of carbon regeneration. Preferably, the temperature is room temperature. However, higher temperatures up to 120° C. may be utilized to speed the rate of the reaction without causing carbon loss.

The carbon regeneration step of this invention involves washing or soaking the carbon adsorbent that is used in the dry flue gas desulfurization in a basic reducing solution consisting essentially of sodium sulfite and water. The reducing solution has a pH from above 7.0 to about 12.0, and the preferred range is about 8.0 to 10.0. The reducing solution is made by admixing sodium sulfite with an aqueous medium, such as water, to obtain a solution which needs to have a pH greater than 7.0. A base, such as sodium hydroxide, may be used to adjust the reducing solution to above 7.0.

The reducing solution reduces $SO_3$ to $SO_2$ to prevent carbon loss. The basic solution neutralizes the sulfuric acid in the carbon pores thereby preventing any further carbon loss. Sodium sulfite can be used for long times in a cyclic reaction since it is the product that is produced from the reaction of sodium hydroxide with $SO_2$. The sodium hydroxide is formed in the electrolytic reactor at the cathode with sulfuric acid at the anode, and is then recycled to form the sodium sulfite. Using sodium sulfite ($Na_2SO_3$) and water ($H_2O$) as the reducing solution, the following reactions demonstrate the invention at room temperature.

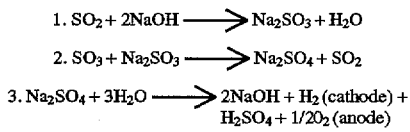

1. $SO_2 + 2NaOH \longrightarrow Na_2SO_3 + H_2O$
2. $SO_3 + Na_2SO_3 \longrightarrow Na_2SO_4 + SO_2$
3. $Na_2SO_4 + 3H_2O \longrightarrow 2NaOH + H_2 \text{(cathode)} + H_2SO_4 + 1/2O_2 \text{(anode)}$

EXAMPLES

Example 1

Figure 1:
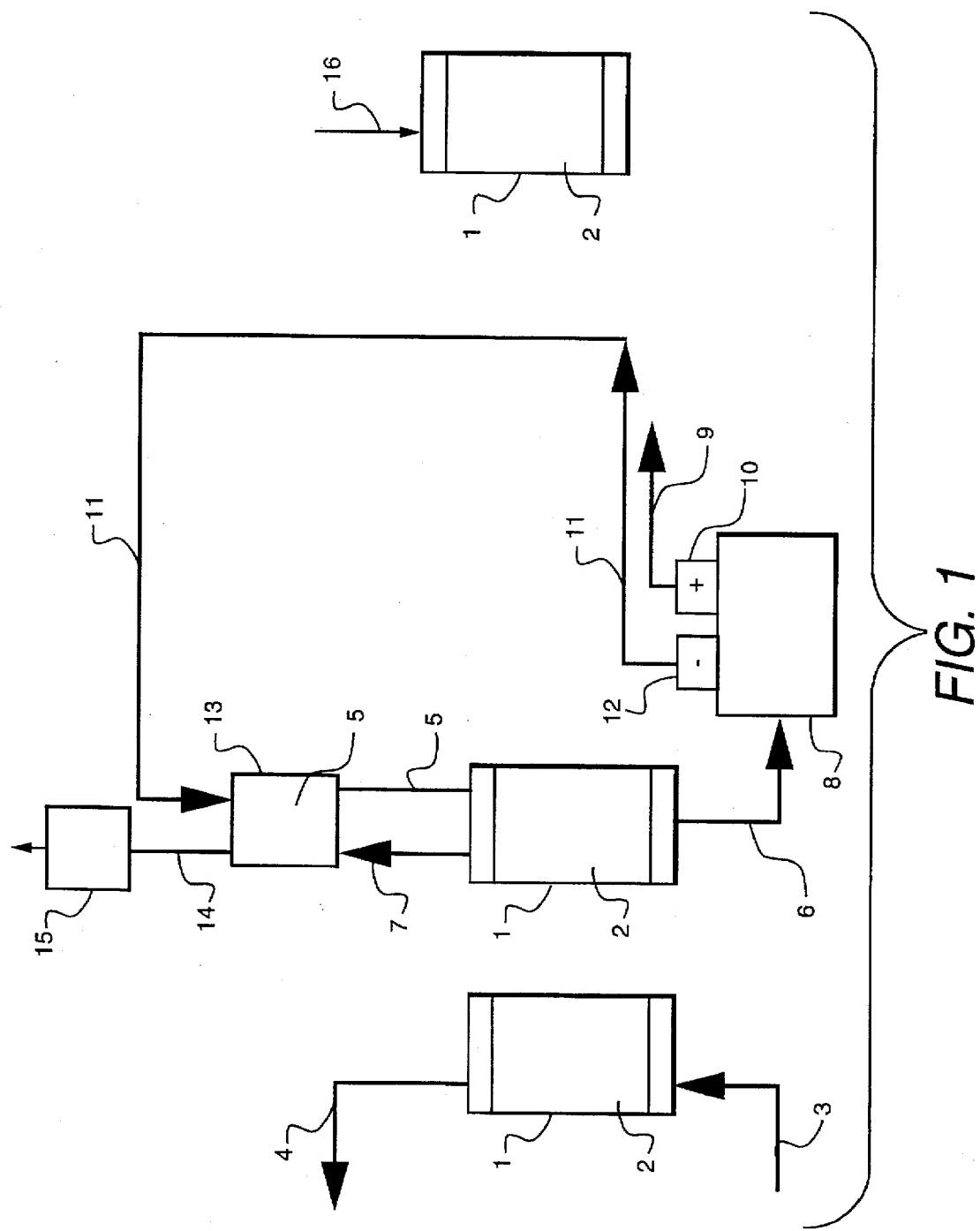
FIG. 1 is a diagram of a batch operation of a dry flue gas desulfurization process for the production of sulfuric acid and recycling of sodium hydroxide.

To further demonstrate the invention for producing sulfuric acid from dry flue gas desulfurization technology using low temperature carbon adsorbent regeneration, now turning to FIG. 1, there is shown one embodiment of the invention for batch operation. By batch operation is meant that system is confined to a single vessel for sulfur adsorption and carbon regeneration. In the first step of the system, coming from the boiler the flue gas 3 enters the adsorber vessel 1 where the gas is brought into contact with the activated dry carbon adsorbent 2. The sulfur dioxide is sorbed into the dry carbon. The desulfurized flue gas 4 passes to the stack directly. The next step of the system is the regeneration of the carbon adsorbent. In the batch process, this step is also done in the adsorber vessel 1. During regeneration of the carbon 2, the carbon adsorbent 2 loaded with sulfur and sulfur-containing compounds is washed or soaked with a basic reducing solution 5 consisting essentially of sodium sulfite and water. The reducing solution 5 has a pH above 7.0. By-products from washing the carbon adsorbent, sodium sulfate 6 and gaseous sulfur dioxide 7 are removed from the vessel 1. The sodium sulfate solution 6 enters an electrolytic reactor 8 and is converted to sulfuric acid 9 at the anode 10 and sodium hydroxide 11 at the cathode 12. A cation exchange membrane may be used to separate the sulfuric acid from the sodium hydroxide. The sodium hydroxide solution 11 is then further recycled to a reducing solution vessel 13. In the reducing solution vessel 13 the sodium hydroxide solution 11 is reacted with the sulfur dioxide 7 to form sodium sulfite 5. From the reducing solution vessel 13, unreacted sulfur dioxide 14, enters a sulfur dioxide scrubber 15. After the completion of the regeneration of the carbon adsorbent, the carbon is dried in the adsorber vessel 1 with hot air or nitrogen 16.

Example 2

Figure 2:
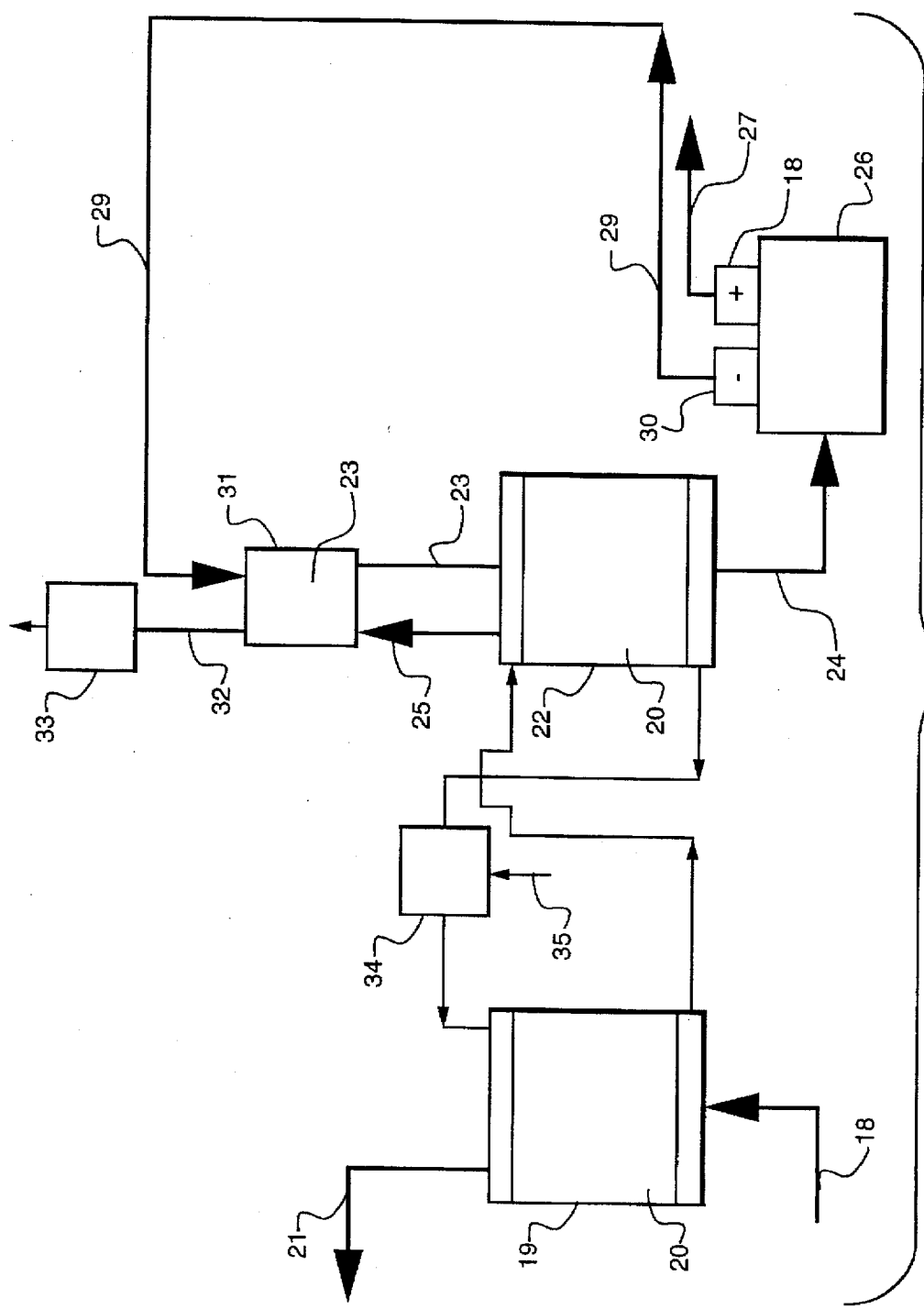
FIG. 2 is a diagram of a continuous operation of a dry flue gas desulfurization process for the production of sulfuric acid and recycling of sodium hydroxide.
Figure 3:
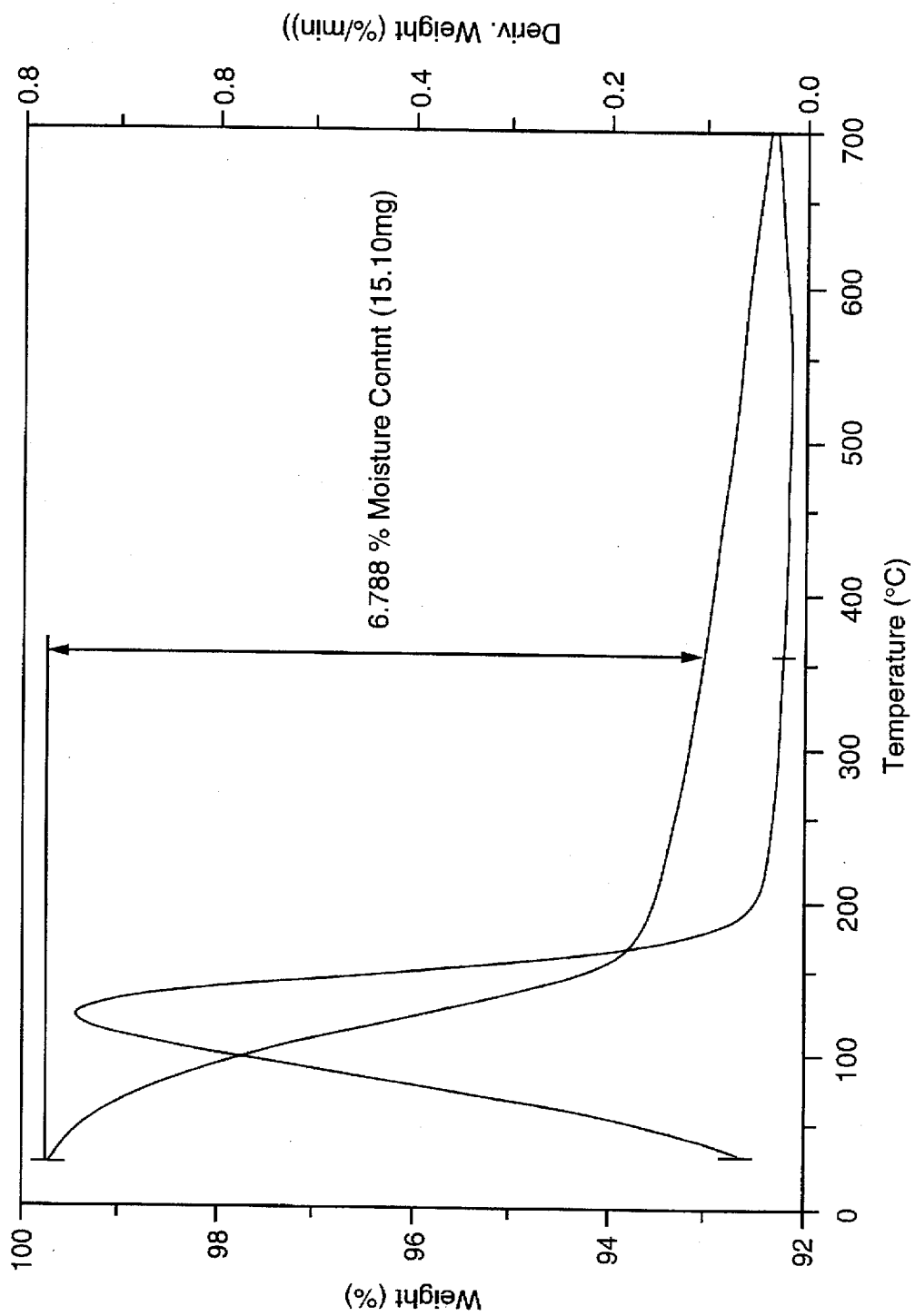
FIG. 3 is a thermogram of clean carbon that is used as a baseline.
Figure 4:
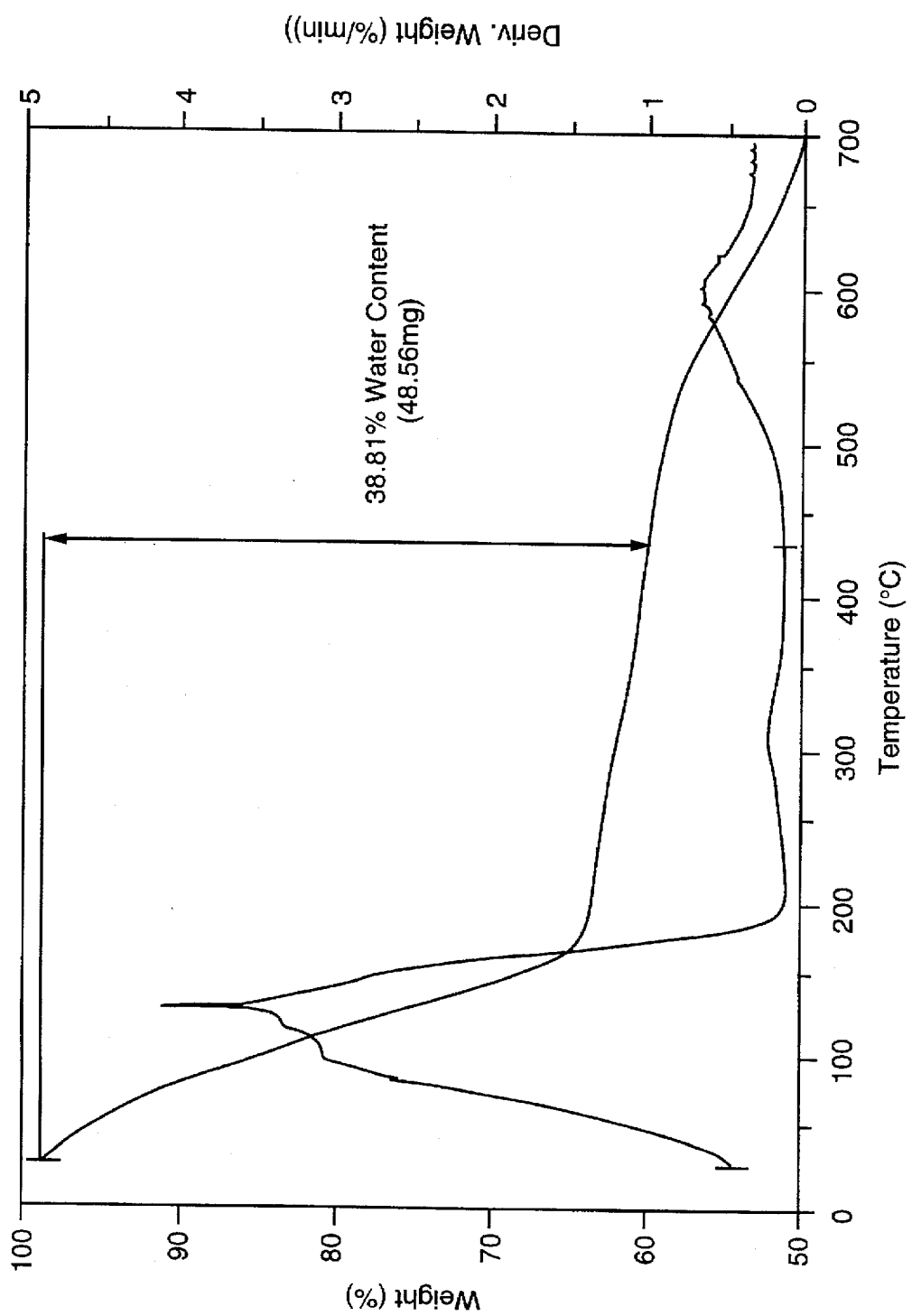
FIG. 4 is a thermogram of contaminated carbon after soaking in a sodium sulfite reducing solution for fifteen minutes.
Figure 5:
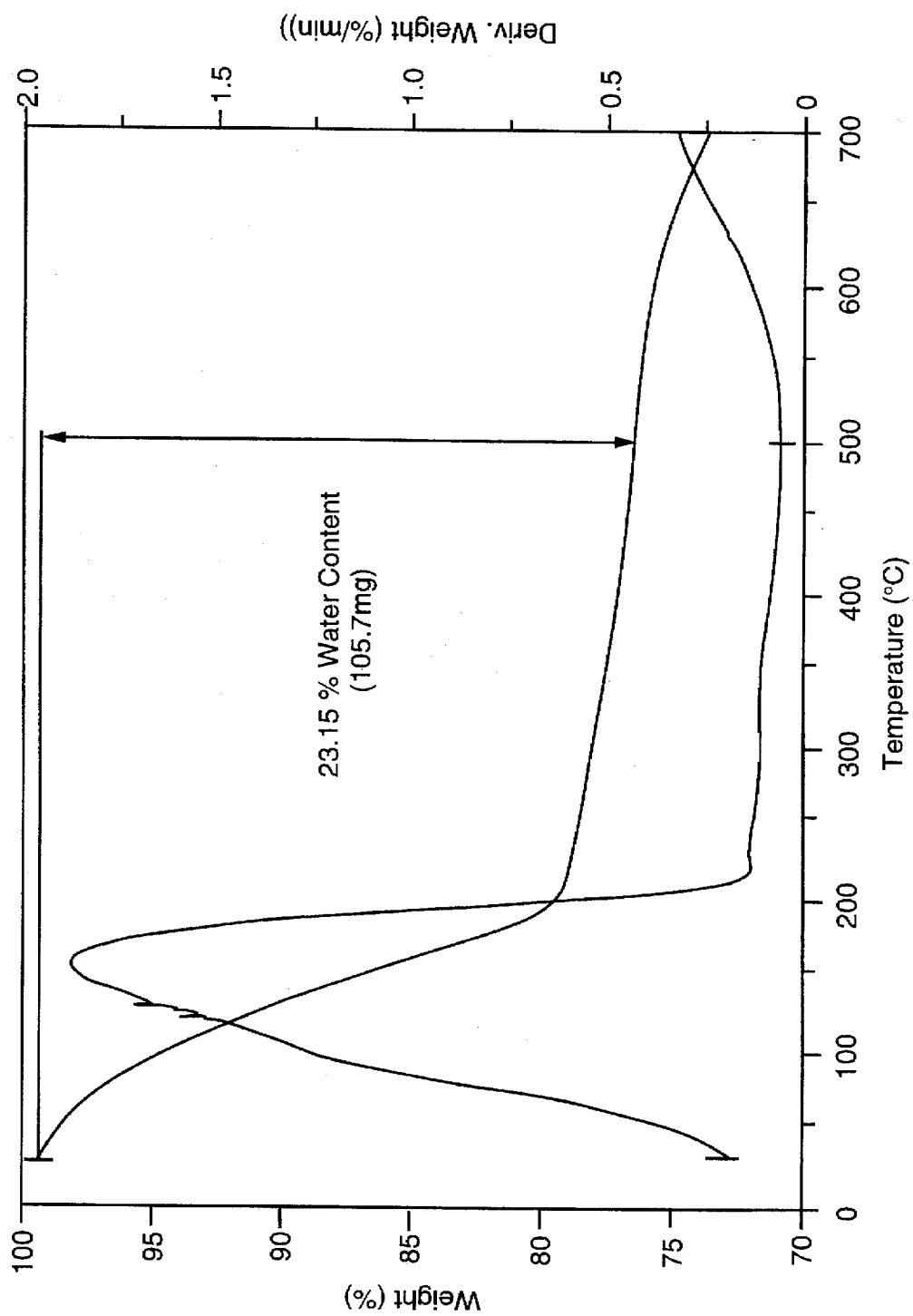
FIG. 5 is a thermogram of contaminated carbon after soaking in a sodium sulfite reducing solution for twenty minutes.
Figure 6:
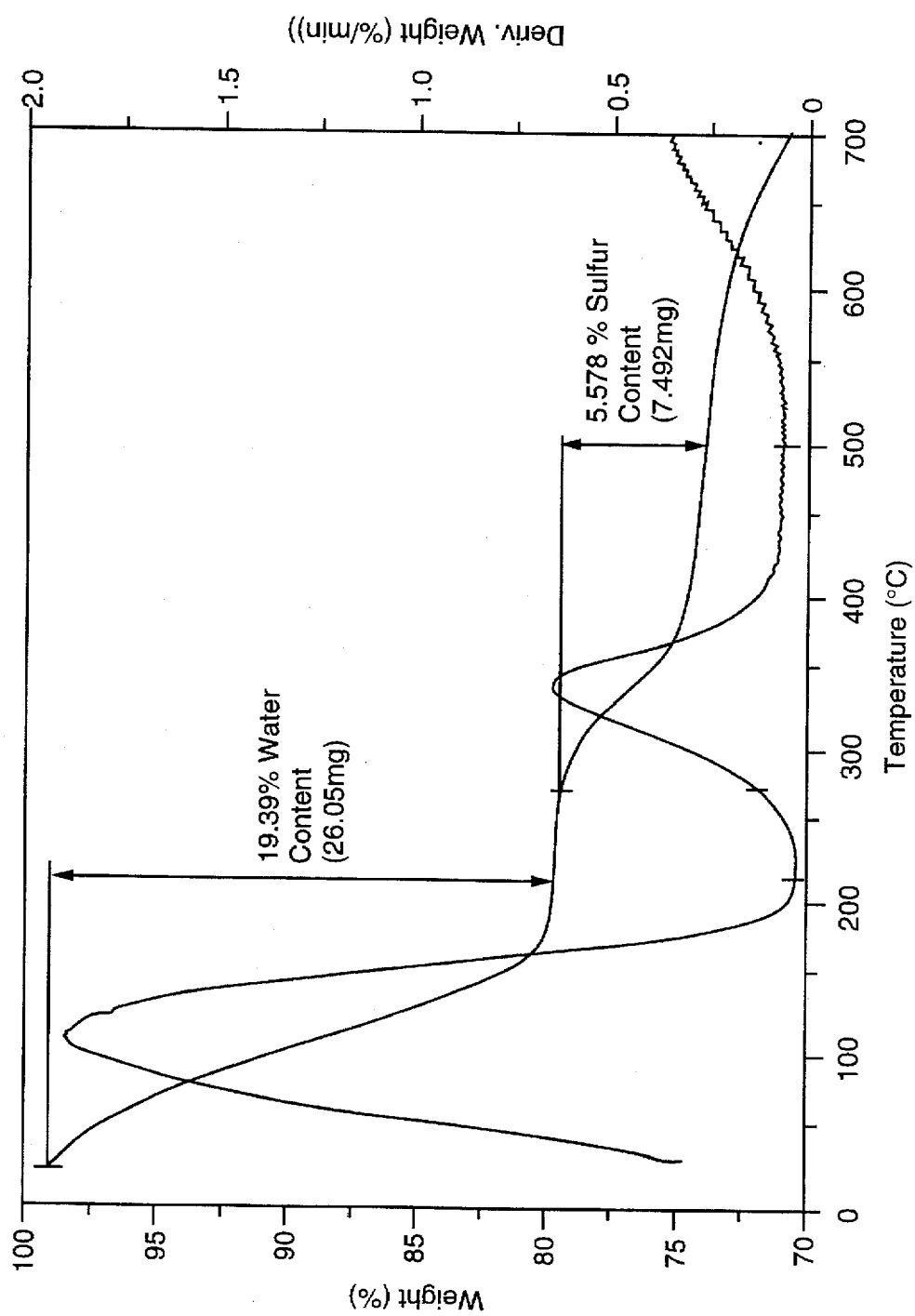
FIG. 6 is a thermogram of contaminated carbon after soaking in water for twelve hours.

In a second embodiment of the invention, now turning to FIG. 2, there is shown a continuous system for sulfuric acid production from dry flue gas desulfurization using low temperature carbon adsorbent regeneration. In the first step of the system, coming from the boiler the flue gas 18 enters the adsorber vessel 19 where the gas is brought into contact with the activated dry carbon adsorbent 20. The sulfur dioxide is sorbed into the dry carbon. The desulfurized flue gas 21 passes to the stack directly. The next step of the system is done in a carbon regenerator vessel 22, where the carbon adsorbent is regenerated at low temperatures using a basic reducing solution 23. The spent carbon adsorbent 20 is removed from the adsorber vessel 19 and is placed in the regenerator vessel 22. This may by done by a moving carbon bed. During regeneration of the carbon 20, the carbon adsorbent 20 loaded with sulfur and sulfur-containing compounds is washed or soaked with a basic reducing solution 23 consisting essentially of sodium sulfite and water. The reducing solution 23 has a pH above 7.0. By-products from washing the carbon adsorbent 20, sodium sulfate 24 and gaseous sulfur dioxide 25 are removed from the vessel 22. The sodium sulfate solution 24 enters an electrolytic reactor 26. The sodium sulfate solution 24 is converted to sulfuric acid 27 at the anode 28 and sodium hydroxide 29 at the cathode 30. A cation exchange membrane may be used to separate the sulfuric acid from the sodium hydroxide. The sodium hydroxide solution 29 is then further recycled to a reducing solution vessel 31. In the reducing solution vessel 31 the sodium hydroxide solution 29 is reacted with the sulfur dioxide 25 to form sodium sulfite reducing solution 23. From the reducing solution vessel 31, unreacted sulfur dioxide 32, enters a sulfur dioxide scrubber 33. After the completion of the regeneration of the carbon adsorbent 20, the regenerated carbon is removed from the regenerator vessel 22 and dried in the drier vessel 34 with hot air or nitrogen 35. The regenerated carbon is then placed in the adsorber vessel 19 for use in dry flue gas desulfurization.

Example 3

To test the use of the basic reducing solution on carbon adsorbents utilized in flue gas desulfurization technology, a thermogravimetric analyzer (TGA) was used to obtain thermograms of clean and contaminated carbon. The carbon loading of sulfur contaminants was found to be about sixteen weight percent. The contaminated carbon was soaked at room temperature in aqueous solutions of sodium sulfite having a pH of 9.5 and water alone. The soaked carbon adsorbent was then run in the thermogravimetric analyzer. The produced thermograms showed that the carbon which was soaked in water took longer to regenerate the carbon then reducing solutions of sodium sulfite. The water took approximately three days to regenerate the carbon adsorbent. However, in the use of sodium sulfite solutions, regenerated carbon was obtained in less than seven minutes. FIGS. 3–6 give the thermograms for clean carbon; carbon soaked in sodium sulfite for fifteen minutes; carbon soaked in sodium sulfite for seven minutes; and carbon soaked in water alone for twelve hours, respectively.

What is claimed:

1. A method for making sulfuric acid which comprises adsorbing sulfur dioxide onto dry activated carbon; washing the resulting sulfur dioxide bearing activated carbon with an aqueous sodium sulfite solution having a pH of from about 7 to about 12 at a temperature from about room temperature to about 120° C., to provide an aqueous solution of sodium sulfate; electrolyzing the sodium sulfate solution in an electrochemical reactor to produce sulfuric acid at the anode and sodium hydroxide at the cathode.

2. The method of claim 1 in which the pH is adjusted from about 8 to about 10 by addition of sodium hydroxide to the sodium sulfite solution.

3. The process of claim 2 in which the pH is about 9.5 and the wash temperature is ambient temperature from about 20° C. to about 25° C.

* * * * *